Sept. 19, 1961 W. B. GREEN 3,000,085

PLATING OF SINTERED TUNGSTEN CONTACTS

Filed June 13, 1958

WITNESSES

Leon J. Laza

Charles L. Menzemer

INVENTOR

William B. Green

BY

Frederick Shapoe

ATTORNEY

United States Patent Office 3,000,085
Patented Sept. 19, 1961

3,000,085
PLATING OF SINTERED TUNGSTEN CONTACTS
William B. Green, Greensburg, Pa., assignor to Westinghouse Electric Corporation, East Pittsburgh, Pa., a corporation of Pennsylvania
Filed June 13, 1958, Ser. No. 741,870
5 Claims. (Cl. 29—183.5)

This invention relates to semiconductor devices, and have particular reference to a silicon semiconductor device comprised of a tungsten base member that has been coated with at least a first layer of copper and at least a second layer of a precious metal to reduce the forward resistance of the device.

The general practice has been to use a nickel coated molybdenum base member joined to the ohmic side of a silicon wafer in assembling silicon rectifying semiconductor devices. This procedure has not proven to be entirely satisfactory, however, since the nickel leads to the degradation of electrical characteristics of the device, and the molybdenum and silicon may react chemically to form a compound which deposits on the molybdenum and increases the forward resistance of the semiconductor device.

An object of the present invention is to provide a semiconductor device, including a base contact member comprising a tungsten body, at least a first coating of copper disposed about and completely covering said tungsten body, and at least a second coating of a precious metal disposed about said copper coating, which device has a reduced forward resistance.

Another object of the present invention is to provide a process for depositing upon a tungsten body, a first layer of copper and a second layer of a metal selected from the group consisting of gold and silver to produce an improved electrical contact member suitable for semiconductors.

Other objects of the invention will, in part, be obvious and will, in part, appear hereinafter.

For a better understanding of the nature and objects of the invention, reference should be had to the following detailed description and drawings, in which.

In accord with the present invention and attainment of the foregoing objects, there is provided a semiconductor device comprising a tungsten base contact member, said tungsten base member having at least a first layer of copper disposed about and completely covering said tungsten base member, and at least a second layer of a metal, selected from the group consisting of gold and silver, disposed about and completely covering the copper layer.

The preparation process of the tungsten base member in accord with this invention will differ slightly depending upon the method desired for subsequently joining the finished member to a heat sink. The invention will be described in accord with the process for preparing base members suitable, first, for joining to the heat sink by brazing and second, by soft soldering.

Figure 1:
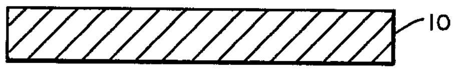
FIGURE 1 is a cross-sectional view of a tungsten member suitable for treatment in accord with this invention.
Figure 2:
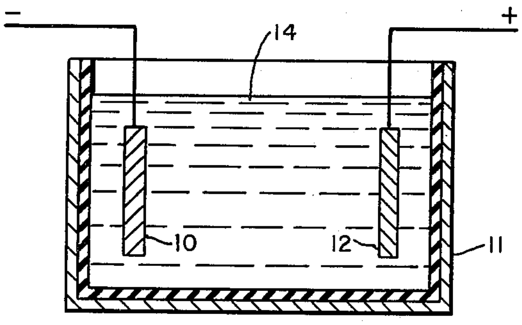
FIG. 2 is a side view partially in cross section of an electrolytic bath suitable for use in accord with this invention.

More specifically, and with reference to FIG. 1, a tungsten member 10, prepared in accord with powdered metallurgy procedure is immersed in an electrolytic cell or bath 11 as illustrated in FIG. 2. Disposed in said electrolytic bath 11 is the tungsten base member 10 which serves as the cathode, and a copper anode 12. The bath 11 comprises a suitable aqueous copper coating electrolyte 14 which, for example, may be comprised of one gallon of water, 6 ounces of copper cyanide, 9 ounces of sodium cyanide, 6 to 10 ounces of Rochelle salt, and from 1 to 2 ounces of caustic potash. A voltage in the range of 6 to 12 volts is impressed (from a source not shown) between the copper anode 12 and the tungsten cathode 10 for a period of time sufficient to deposit a strike of copper having a thickness of at least 0.00001 inch thick upon the tungsten cathode 10. Satisfactory results have been achieved by applying the voltage for a period of time in the range of from ½ to 5 minutes with the electrolyte at a temperature in the range of 130° F. to 140° F.

Figure 3:
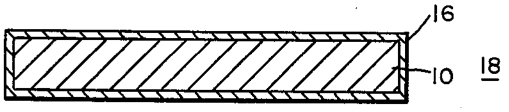
FIG. 3 is a cross-sectional view of a tungsten member with a coating of copper disposed about and completely covering said tungsten.

Said tungsten member 10 with its copper coating 16, illustrated as member 18 in FIG. 3, is then sintered at a temperature in the range of 900° C. to 1200° C. for a period of time in the range of from 1 to 10 minutes in a suitable furnace (not shown) with an inert or reducing atmosphere, as for example, a vacuum, or a hydrogen, argon, or nitrogen gas or mixtures of two or more.

The member 18 is then immersed in an electrolytic cell similar to that illustrated in FIG. 2. The electrolytic cell is comprised of member 18 as the cathode, an anode comprised of a metal selected from the group consisting of gold and silver, and a suitable electrolyte. A suitable electrolyte, when the anode is comprised of silver, may be for example, comprised of one gallon of water, 5 ounces of silver cyanide, and from 8 to 10 ounces of sodium cyanide. When the anode is comprised of gold, a suitable electrolyte for example, may be comprised of one gallon of water, 8 pennyweight of potassium cyanoaurate, 4 ounces of sodium cyanide, and 3 ounces of disodium sulphate.

When the anode is comprised of silver and the electrolyte is comprised of the water-silver cyanide-sodium cyanide mixture described above, optimum results have been achieved by impressing a voltage in the range of 6 to 12 volts between the anode and the cathode for a period of time sufficient to deposit a silver strike having a thickness of approximately 0.00001 inch. Good results are achieved when the electrolyte of water-silver cyanide-sodium cyanide has a temperature in the range of 72° F. to 78° F.

When the anode is comprised of gold and the electrolyte is comprised of the water-potassium cyanoaurate-sodium cyanide-disodium sulphate mixture described above at a temperature in the range of 110° F. to 120° F., optimum results have been achieved by impressing a voltage in the range of 4 to 6 volts between the anode and the cathode for a period of time sufficient to deposit a gold strike having a thickness of approximately 0.00001 inch.

Figure 4:
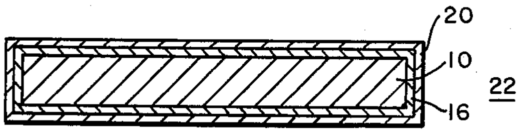
FIG. 4 is a cross-sectional view of the copper coated tungsten member of FIG. 3 with a coating of precious metal disposed about the copper.

The copper coated tungsten member 18 with its silver strike 20, illustrated as member 22 in FIG. 4, is then immersed in a silver plating electrolytic cell similar to the cell illustrated in FIG. 2 in which it serves as a cathode and in which the electrolyte is comprised of one gallon of water, 4 ounces of silver cyanide, 7.5 ounces of potassium cyanide, 6.0 ounces of potassium carbonate, said electrolyte having a temperature in the range of 72° F. to 78° F., and the anode is comprised of silver. A voltage of one volt is impressed between the anode and the cathode for a period of time sufficient to deposit an additional coating of silver having a thickness of at least 0.0001 inch, thereby resulting in member 26, illustrated in FIG. 5, comprised of the tungsten member 10 with the first layer of copper 16 disposed about and completely covering the tungsten, the second layer comprised of the silver strike 20 disposed about and completely covering the copper layer 16 and a third layer 24 comprised of silver disposed over the silver strike 20.

Figure 5:
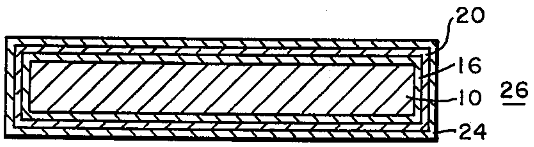
FIG. 5 is a cross-sectional view of the member of FIG. 4 with an additional coating of a precious metal disposed thereabout.

With reference to FIG. 5, if the strike 20 is comprised of gold the coating 24 may be comprised of gold in a thickness of at least 0.0001 inch.

The member 26 as illustrated in FIG. 5 is suitable for use as the base member of a semiconductor device and may be brazed with a suitable hard solder to a heat sink to provide the semiconductor device with additional mechanical strength. Examples of suitable solders are copper, silver, gold and alloys thereof, and additional components such as phosphorous, silicon, germanium, lead, or tin, for example, (*a*) silver 60%, copper 30%, tin 10%, (*b*) silver 96%, lead 2%, silicon 2%, and (*c*) silver 72%, copper 25%, silicon 2%.

If in assembling the semiconductor device it is deemed desirable to join the semiconductor base member to the heat sink by soldering with a soft solder, for example, a solder comprised of tin and lead, with other additions such as silver, 40% lead, 60% tin; 88% lead, 10% tin, 2% silver; 95% lead, 5% tin, the base member is prepared in the following manner.

A copper strike having a thickness of at least 0.00001 inch is applied to the tungsten and the body sintered as described above.

The copper coated tungsten member similar to member 18 of FIG. 3 is then immersed into a suitable electrolytic bath, similar to that illustrated in FIG. 2, where it serves as the cathode. The anode is comprised of copper and the electrolyte may be any suitable electrolyte, for example, the copper cyanide bath described above. A voltage in the range of 6 to 12 volts is impressed across the anode and cathode and maintained until an additional plating of copper having at least a thickness of 0.0001 inch is deposited on the cathode. A thickness of up to 0.0005 inch may be applied.

Following copper plating, the cathode is then inserted into another electrolytic bath, similar to that shown in FIG. 2, in which the anode is comprised of silver and the electrolyte is the silver cyanide-sodium cyanide electrolyte described above. A voltage of from 6 to 12 volts is impressed between the anode and cathode and maintained until a silver coating having a thickness of at least 0.0001 inch is deposited on the cathode.

Equally satisfactory results can be achieved by applying a gold coating in place of the above described silver coating.

The semiconductor base member thus prepared is suitable for use in a semiconductor device and may be joined to the heat sink with soft solder.

A semiconductor device comprised of a base member prepared in accord with this invention exhibits substantially less forward resistance than a similar device comprised of a nickel coated molybdenum base member. The plated tungsten contact members may be employed in various semiconductor devices such as diodes, transistors, and other structures as the electrodes, counterelectrodes and base electrodes.

Since certain changes in carrying out the above processes and in the product embodying the invention may be made without departing from its scope, it is intended that the accompany description and drawings be interpreted as illustrative and not limiting.

I claim as my invention:

1. In a semiconductor device comprising a tungsten base contact member, the improvement comprising said tungsten base contact member having at least a first layer of sintered copper disposed about and completely covering its surface, and at least a second electrodeposited layer of a metal selected from at least one of the group consisting of gold and silver disposed about and completely covering the copper.

2. In a semiconductor device comprising a tungsten base contact member, the improvement comprising said tungsten base contact member having a first electrodeposited layer of sintered copper disposed about and completely covering its surface, said copper layer having a range of 0.00001 to 0.0005 inch, a second electrodeposited layer of metal disposed about and completely covering said first layer, said second layer being comprised of a metal selected from at least one of the group consisting of gold and silver, said second layer having a thickness of at least 0.00001 inch, and a third electrodeposited layer of a metal disposed about and completely covering said second layer, said third layer being comprised of at least one metal selected from the group consisting of gold and silver and having a thickness of at least 0.0001 inch.

3. A semiconductor device comprising a tungsten base contact member joined to a silicon semiconductor element, said tungsten base contact member having a first layer of sintered copper disposed about and completely covering its surface, said copper layer having a thickness in the range of 0.00001 to 0.0005 inch, a seecond electrodeposited layer of a metal disposed about and completely covering said first layer, said second layer being comprised of a metal selected from at least one of the group consisting of gold and silver, said second layer having a thickness of at least 0.00001 inch, and a third electrodeposited layer of a metal disposed about and completely covering said second layer, said third layer being comprised of at least one metal selected from the group consisting of gold and silver and having a thickness in the range of 0.0001 to 0.001 inch.

4. A semiconductor device comprising a tungsten base contact member joined to a silicon semiconductor element, said tungsten base contact member having a first layer of copper disposed about and completely covering its surface, said copper layer having a thickness of at least 0.00001 inch, a second electrodeposited layer of copper disposed about and completely covering said first layer of copper, said second layer of copper having a thickness of at least 0.0001 inch, and a third electrodeposited layer of a metal disposed about and completely covering said second layer, said third layer being comprised of at least one metal selected from the group consisting of gold and silver and having a thickness of at least 0.00001 inch.

5. A semiconductor device comprising a tungsten base contact member joined to a silicon semiconductor element, said tungsten base contact member having a first layer of sintered copper disposed about and completely covering its surface, said copper layer having a thickness in the range of 0.00001 to 0.0001 inch, a second layer of copper disposed about and completely covering said first layer of copper, said second layer of copper having a thickness in the range of 0.0001 to 0.0005 inch, and a third electrodeposited layer comprised of at least one metal selected from the group consisting of gold and silver disposed about and completely covering said second layer, said third layer of metal having a thickness in the range of 0.00001 to 0.0001 inch.

References Cited in the file of this patent

UNITED STATES PATENTS

| | | |
|---|---|---|
| 1,001,669 | Monnot | Aug. 29, 1911 |
| 1,658,713 | Fuller | Feb. 7, 1928 |
| 2,096,924 | Schwarzkopf | Oct. 26, 1937 |
| 2,429,222 | Ehrhardt | Oct. 21, 1947 |
| 2,490,246 | Zunick | Dec. 6, 1949 |
| 2,556,991 | Teal | June 12, 1951 |

FOREIGN PATENTS

| | | |
|---|---|---|
| 772,583 | Great Britain | Apr. 17, 1955 |